United States Patent
Sakakura et al.

(10) Patent No.: US 10,253,917 B2
(45) Date of Patent: Apr. 9, 2019

(54) INSULATION MATERIAL AND METHOD OF MANUFACTURING SAME

(71) Applicant: NICHIAS CORPORATION, Tokyo (JP)

(72) Inventors: Masatoshi Sakakura, Tokyo (JP); Toshifumi Onuki, Tokyo (JP); Sojiro Fukuyo, Tokyo (JP)

(73) Assignee: NICHIAS CORPORATION, Tokyo (JP)

(*) Notice: Subject to any disclaimer, the term of this patent is extended or adjusted under 35 U.S.C. 154(b) by 12 days.

(21) Appl. No.: 14/734,438

(22) Filed: Jun. 9, 2015

(65) Prior Publication Data

US 2015/0345690 A1    Dec. 3, 2015

Related U.S. Application Data

(63) Continuation-in-part of application No. PCT/JP2013/006470, filed on Oct. 31, 2013.

(30) Foreign Application Priority Data

Dec. 11, 2012   (JP) ................... 2012-270329

(51) Int. Cl.
| | | |
|---|---|---|
| *C04B 35/10* | (2006.01) | |
| *C04B 35/64* | (2006.01) | |
| *C04B 35/80* | (2006.01) | |
| *F16L 59/02* | (2006.01) | |
| *C04B 35/111* | (2006.01) | |
| *C04B 35/117* | (2006.01) | |
| *C04B 35/645* | (2006.01) | |

(52) U.S. Cl.
CPC ............ *F16L 59/028* (2013.01); *C04B 35/10* (2013.01); *C04B 35/111* (2013.01); *C04B 35/117* (2013.01); *C04B 35/64* (2013.01); *C04B 35/645* (2013.01); *C04B 35/803* (2013.01); *C04B 2235/3215* (2013.01); *C04B 2235/3232* (2013.01); *C04B 2235/3236* (2013.01); *C04B 2235/3241* (2013.01); *C04B 2235/3244* (2013.01); *C04B 2235/3248* (2013.01); *C04B 2235/3272* (2013.01); *C04B 2235/349* (2013.01); *C04B 2235/3418* (2013.01); *C04B 2235/3445* (2013.01); *C04B 2235/3454* (2013.01); *C04B 2235/3463* (2013.01); *C04B 2235/36* (2013.01); *C04B 2235/3826* (2013.01); *C04B 2235/446* (2013.01); *C04B 2235/5208* (2013.01); *C04B 2235/5224* (2013.01); *C04B 2235/5228* (2013.01); *C04B 2235/5232* (2013.01); *C04B 2235/5236* (2013.01); *C04B 2235/5445* (2013.01); *C04B 2235/5454* (2013.01); *C04B 2235/602* (2013.01); *C04B 2235/6567* (2013.01); *C04B 2235/9607* (2013.01)

(58) Field of Classification Search
CPC ...... F16L 59/028; C04B 35/10; C04B 35/111; C04B 35/117; C04B 35/64; C04B 35/645; C04B 35/803
See application file for complete search history.

(56) References Cited

U.S. PATENT DOCUMENTS

| | | | |
|---|---|---|---|
| 5,733,830 A | 3/1998 | Endo et al. | |
| 2007/0003751 A1* | 1/2007 | Mortimer | C04B 38/0054 428/312.2 |
| 2013/0266801 A1* | 10/2013 | Sakamoto | B28B 11/24 428/338 |

FOREIGN PATENT DOCUMENTS

| | | | |
|---|---|---|---|
| JP | 2-239121 | * | 9/1990 |
| JP | 2-239121 A | | 9/1990 |
| JP | 5-170525 A | | 7/1993 |
| JP | 07-256100 A | | 10/1995 |
| JP | 9-100171 A | | 4/1997 |
| JP | 11-302954 A | | 11/1999 |
| JP | 2001-330375 A | | 11/2001 |
| JP | 2008-162852 A | | 7/2008 |
| JP | 2012-149658 A | | 8/2012 |
| WO | WO 2012/086469 | * | 6/2012 |
| WO | 2012/090566 A1 | | 7/2012 |

OTHER PUBLICATIONS

International Search Report issued in corresponding application No. PCT/JP2013/006470, completed Jan. 14, 2014 and dated Jan. 28, 2014.
English translation of the International Preliminary Report on Patentability, issued in corresponding application No. PCT/JP2013/006470 dated Jun. 16, 2015.
Office Action issued in co-pending Japanese application 2014-016490 dated Mar. 6, 2015, with machine translation.
Machine translation of Office Action issued in co-pending Japanese application 2014-016490 dated Apr. 28, 2015 (previously submitted).
Nishimura Advanced Ceramic, Characteristic, http://www.nishimuratougyou.co.jp/english/wp-content/themes/itri/common/images/tokusei.pdf (downloaded Oct. 13, 2017).

* cited by examiner

*Primary Examiner* — C Melissa Koslow
(74) *Attorney, Agent, or Firm* — Oliff PLC

(57) ABSTRACT

A heat insulation material obtained by sintering a raw material comprising: 52 to 93 weight % of alumina particles having an average particle diameter of 100 nm or smaller, 1 to 45 weight % of one or more crystal transition suppression materials selected from silica particles, silica stone, talc, mullite, silicon nitride, silica fume, wollastonite, bentonite, kaolin, sepiolite and mica particles, 0 to 40 weight % of a radiation scattering material, and 1 to 20 weight % of fibers.

10 Claims, 1 Drawing Sheet

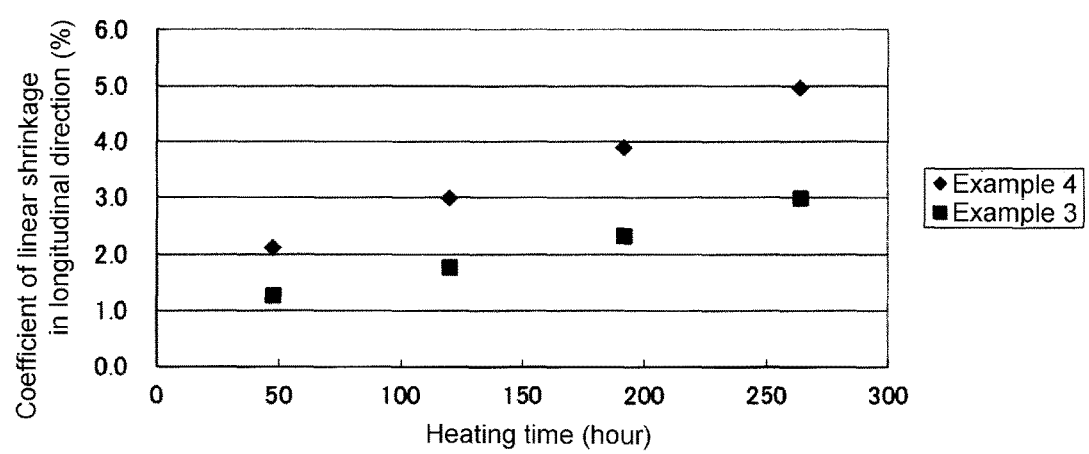

INSULATION MATERIAL AND METHOD OF MANUFACTURING SAME

This is a Continuation-in-Part Application in the United States of International Patent Application No. PCT/JP2013/006470 filed Oct. 31, 2013, which claims priority on Japanese Patent Application No. 2012-270329, filed Dec. 11, 2012. The entire disclosures of the above patent applications are hereby incorporated by reference.

TECHNICAL FIELD

The invention relates to a heat insulation material and a method of producing the same. In particular, it relates to improvement of heat resistance of a heat insulation material.

BACKGROUND ART

A heat insulation material composed of a press-formed body containing silica particles or alumina particles, a radiation scattering material and reinforcing fibers is known so far (for example, Patent Document 1). A heat insulation material composed of silica particles largely shrinks when used at a temperature environment of higher than 1100° C. Therefore, a heat insulation material which has a heat resistance against at a temperature of higher than 1100° C. has been required. Further, a heat insulation material which has strength and a thermal conductivity equivalent to those of the one containing silica particles has is desired.

RELATED ART DOCUMENTS

Patent Documents

Patent Document 1: JP-A-2012-149658

SUMMARY OF THE INVENTION

The invention was made in view of the above-mentioned problems. One of the objects of the invention is to provide a heat insulation material of which heat resistance at a high temperature is improved, and a method of producing the same.

In order to solve the above-mentioned problems, the inventors used aluminum particles instead of silica particles. However, even though the heat insulation material composed mainly of alumina particles, of which heat resistance is superior to those composed mainly of silica particles, it largely shrinks at a temperature of higher than 1150° C., and thus it was insufficient in the heat resistance. The inventors found that conversion of alumina into corundum (crystal transition) is a reason for such shrinkage, and sought for compounds capable of suppressing the ratio of the conversion to corundum, thereby accomplished the invention.

According to the invention, the following heat insulation material and method of producing the same are provided.
1. A heat insulation material obtained by sintering a raw material comprising:
   52 to 93 weight % of alumina particles having an average particle diameter of 100 nm or smaller,
   1 to 45 weight % of one or more crystal transition suppression materials selected from the group consisting of silica particles, silica stone, talc, mullite, silicon nitride, silica fume, wollastonite, bentonite, kaolin, sepiolite and mica particles,
   0 to 40 weight % of a radiation scattering material, and
   1 to 20 weight % of fibers.
2. The heat insulation material according to 1, wherein an amount of the alumina particles, the crystal transition suppression material, the fibers and the radiation scattering material is 95 weight % or more in total.
3. The heat insulation material according to 1 or 2, wherein the crystal transition suppression material is silica particles having an average particle diameter of 100 nm or smaller.
4. The heat insulation material according to any one of 1 to 3, which comprises:
   60 to 80 weight % of the alumina particles,
   4 to 10 weight % of the crystal transition suppression material,
   10 to 30 weight % of the radiation scattering material, and
   2 to 10 weight % of the fibers.
5. The heat insulation material according to any one of 1 to 4, wherein the radiation scattering material is one or more selected from the group consisting of silicon carbide, zirconia, zircon, zirconium silicate, titania, iron oxide, chromium oxide, zinc sulfide and barium titanate.
6. The heat insulation material according to any one of 1 to 5, wherein the fibers are one or more selected from the group consisting of glass fibers, silica-alumina fibers, silica-alumina-magnesia fibers, silica fibers, alumina fibers, zirconia fibers, biosoluble inorganic fibers, rock wool and basalt fibers.
7. The heat insulation material according to any one of 1 to 3, which comprises:
   52 to 70 weight % of the alumina particles,
   2 to 10 weight % of the crystal transition suppression material,
   20 to 40 weight % of zirconia, and
   2 to 10 weight % of alumina fibers.
8. A method of producing a heat insulation material according to 1, which comprises:
   mixing the following components to obtain a mixture:
   alumina particles having an average particle diameter of 100 nm or smaller,
   at least one crystal transition suppression material selected from the group consisting of silica particles, silica stone, talc, mullite, silicon nitride, silica fume, wollastonite, bentonite, kaolin, sepiolite and mica particles,
   fibers, and
   optionally a radiation scattering material;
   subjecting the mixture to press forming to form a press-formed body by, and
   sintering the press-formed body.
9. The method of producing a heat insulation material according to 8, wherein the sintering is carried out at a temperature of higher than 1000° C.

According to the invention, a heat insulation material having an improved heat resistance at a high temperature and a method of producing the same can be provided.

BRIEF DESCRIPTION OF THE DRAWINGS

FIG. 1 is a graph showing linear shrinkage in longitudinal direction of the heat insulation materials obtained in Examples 3 and 4.

MODE FOR CARRYING OUT THE INVENTION

The heat insulation material of the invention includes alumina particles, material of suppressing conversion of alumina into corundum (referred to as crystal transition suppression material or transition suppression material) and fibers.

The alumina particles are not particularly limited as long as the alumina particles are those containing mainly alumina ($Al_2O_3$) other than α-alumina (corundum) (for instance, particles containing 95 weight % or more of the alumina, and they can be used as a raw material for a heat insulation material. Here, this alumina particles may be those which do not contain α-alumina (for example, no corundum peak is detected in XRD measurement).

The alumina particles have an average particle diameter of their primary particles of 100 nm or smaller, for example. The average particle diameter of the primary particles of the alumina particles may be 50 nm or smaller, and 30 nm or smaller. Although the lower limit of the average diameter of the primary particles of the alumina particles is not particularly limited, it may be 2 nm or more, for example.

The average particle diameter is obtained by observation of particle diameters of approximately 100 particles chosen randomly with a transmission electron microscope (TEM) or a field emission scanning electron microscope (FE-SEM).

The alumina particles are those manufactured by a gas phase method and/or those by a wet method, for example. Namely, the alumina particles may be, for example, dry alumina particles manufactured by a gas phase method or wet alumina particles manufactured by a wet method. More specifically, the alumina particles are, for example, fumed alumina particles manufactured by a gas phase method.

As the crystal transition suppression material, one or more selected from the group consisting of silica particles, silica stone, talc, mullite, silicon nitride, silica fume, wollastonite, bentonite, kaolin, sepiolite and mica particles may be used. Silica particles are preferable, and more preferable is silica particles having an average particle diameter of 100 nm or smaller.

The average diameter of the primary particles of silica particles may be 50 nm or smaller, or 30 nm or smaller. Although the lower limit of the average diameter of the primary particles of silica particles is not particularly limited, it may be 2 nm or more, for example.

Silica particles are those manufactured by a gas phase method and/or those by a wet method, for example. Namely, silica particles may be dry silica particles manufacture by a gas phase method, and wet silica particles by a wet method, for example. More specifically, silica particles are fumed silica particles manufactured by a gas phase method, for example.

An amount of alumina particles included in the raw material of the heat insulation material is not particularly limited as long as it is within a range that desired properties can be attained. The heat insulation material includes alumina particles in an amount of 52 to 93 weight %, 53 to 92 weight %, 56 to 90 weight %, preferably 60 to 80 weight %, and more preferably 65 to 75 weight %, for example.

An amount of the crystal transition suppression material included in the raw material of the heat insulation material is not particularly limited as long as it is within a range that desired properties can be attained. The amount of the transition suppression material in the heat insulation material is, for example, 0.5 to 45 weight %, preferably 1 to 35 weight %, more preferably 2 to 25 weight %, and further preferably 3 to 10 weight %. When the amount of the crystal transition suppression material is too small, the sufficient effect may not be exhibited. When the amount of the crystal transition suppression material is too large, shrinkage may become large or the heat insulating property may deteriorate. In the case of using silica particles, the most preferable amount thereof is 5 to 8 weight %.

The transition suppression material used in the invention includes silicon element, and the ratio of Si to Al, Si/Al can be adjusted within a range that the advantage of the invention can be obtained. For instance, it may be within a range of 0.008 to 1.0, 0.01 to 0.9 or 0.02 to 0.8.

The heat insulation material preferably includes inorganic fibers as the fibers. The fibers are not particularly limited as long as they can reinforce a formed body. Here, the fibers used in the invention do not include organic fibers. The heat insulation material of the invention is produced or used at a high temperature, and therefore organic fibers are burned and lost.

The inorganic fibers include one or more selected from the group consisting of glass fibers, silica-alumina fibers, silica-alumina-magnesia fibers, silica fibers, alumina fibers, zirconia fibers, biosoluble inorganic fibers, rock wool and basalt fibers. Silica-alumina-magnesia fibers and alumina fibers are preferable.

As the biosoluble inorganic fibers, inorganic fibers having a composition in which a total amount of $SiO_2$, $Al_2O_3$ and $ZrO_2$ is 50 to 82 weight % and a total amount of CaO and MgO is 18 to 50 weight % can be given. Also, inorganic fibers having a composition in which an amount of $SiO_2$ is 50 to 82 weight % and a total amount of CaO and MgO is 10 to 43 weight % can be given.

An average fiber length of the fibers may be 0.5 mm or more and 20 mm or less, or 1 mm or more and 10 mm or less, for example. An average fiber diameter of the fibers may be 1 μm or more and 20 μm or less, or 2 μm or more and 15 μm or less, for example.

An amount of the fibers is, for example, 1 to 20 weight %, preferably 1.5 to 10 weight %, and more preferably 2 to 9 weight %.

Further, the heat insulation material may include a radiation scattering material. The radiation scattering material is not particularly limited as long as it can reduce heat transition due to radiation. As examples of the transition scattering material, one or more selected from the group consisting of silicon carbide, zirconia, zircon, zirconium silicate, titania, iron oxide, chromium oxide, zinc sulfide and barium titanate can be mentioned.

The average particle diameter of the radiation scattering material may be, for example, 1 μm or more and 50 μm or less, or 1 μm or more and 20 μm or less. The radiation scattering material is preferably one having far infrared reflectivity. For instance, material of which a specific refractive index to light of wavelength of 1 μm or more is 1.25 or more is preferable.

One preferred embodiment of the heat insulation material of the invention includes a combination of alumina particles, a crystal transition suppression material (fumed silica, etc.), zirconia and alumina fibers. By the use of a combination of zirconia and alumina fibers, in particular, by the use of alumina fibers, the shrinkage rate lowers. The heat conductivity is also improved. As the amounts of the components, 52 to 70 weight % of alumina particles, 2 to 10 weight % of a crystal transition suppression material, 20 to 40 weight % of zirconia, and 2 to 10 weight % of alumina fibers can be mentioned. Alternatively, 52 to 65 weight % of alumina particles, 3 to 8 weight % of a crystal transition suppression material, 25 to 35 weight % of zirconia, and 3 to 8 weight % of alumina fibers may be mentioned.

The amount of the radiation scattering material is, for example, 1 to 40 weight %, preferably 5 to 35 weight %, and more preferably 10 to 30 weight %.

The heat insulation material may include other metal oxide particles in addition, or may not.

Further, the heat insulation material may not include a binder (for example, an inorganic binder such as water glass adhesive or an organic binder such as a resin).

The raw material of the heat insulation material may contain alumina particles, a crystal transition suppression material, fibers and a radiation scattering material in an amount of 95 weight % or more, 98 weight % or more, or 99 weight % or more in total. The raw material may contain the above-mentioned components, which may contain inevitable impurities, in an amount of 100 weight %.

The heat insulation material of the invention can be obtained by molding a mixed powder including alumina particles, a transition suppression material, etc. More specifically, a mixed powder including the above-mentioned components is filled in a mold having a certain shape, followed by dry press molding to produce a dry press-formed body having a shape corresponding to the mold.

The shape of the molded body is not particularly limited. For instance, a board-like shape, a plate-like shape or a cylindrical shape may be mentioned. The temperature of the dry press molding is not particularly limited. For instance, it may be conducted at a temperature of 0° C. or higher and 100° C. or lower, or 0° C. or higher and 50° C. or lower.

The molded body thus obtained may be used as a heat insulation member or as part of a heat insulation member (in combination with other heat insulation material). When the molded body is used as part of a heat insulation member, the heat insulation member may include, for example, the molded body and one or more other heat insulative members which have heat resistance different from that of the molded body has. Namely, in this case, the heat insulation member may include, for example, the molded body, and a heat insulative member which has higher heat resistance and is stacked on the higher temperature side of the molded body, and/or a heat insulative member which is less costly, has lower heat resistance and stacked on the lower temperature side of the molded body.

In the method of the invention, the mixed powder is heated at a temperature of 700° C. or higher, for example. The mixed powder may be heated before or after formation of a formed body.

The heating temperature is preferably higher than 900° C. and not higher than 1300° C., more preferably 1000 to 1200° C., and further preferably 1050 to 1150° C.

Here, the inventors of the invention had conducted extensive studies of technical means of improving heat resistance of a formed body including alumina particles. As a result, the inventors independently found that a formed body which does not include a transition suppression material, when heated at a temperature of higher than 1100° C., deteriorates in the properties such as heat resistance or heat insulation performance. However, a formed body including a transition suppression material, even when heated at a temperature of higher than 1100° C., maintains the properties effectively.

More specifically, the inventors of the invention first found that when a formed body including alumina particles and no transition suppression material is heated at a temperature of higher than 1100° C., generation of corundum (crystal transition) occurs, and the pore volume and the specific surface area decrease significantly in comparison to the case where the formed body is heated at a temperature of 1100° C. or lower.

Then, the inventors of the invention carried out extensive studies of technical means of suppressing the deterioration of the formed body at such a high temperature. As a result, the inventors found that by using a mixed powder prepared by mixing alumina particles and a transition suppression material, even when a formed body obtained by subjecting it to dry press forming, is heated at a temperature of higher than 1100° C., generation of corundum and decreases in the pore volume and the specific surface area are effectively suppressed, and that the formed product has a smaller coefficient of linear shrinkage by heating at a high temperature (for example, 1200° C.).

The mechanism to prevent the formed body from the deterioration by heat at a temperature of higher than 1100° C. by an addition of a transition suppression material to alumina particles is not clarified. However, as one reason thereof, it is seemed that a composite compound is generated by the reaction of alumina with a transition suppression material, and it suppresses the crystal transition of alumina (generation of corundum), for example.

Further, in the method of the invention, by heating a mixed powder including alumina particles and a transition suppression material at the above-mentioned temperature, the reaction product of aluminum and a transition suppression material, or a transition suppression material may be formed on the surface of alumina particles. In this case, the reaction product of aluminum and a transition suppression material, or a transition suppression material can function as a coating on the surface of alumina particles.

The heat insulation material of the invention has excellent heat resistance. For instance, thermal conductivity at a temperature of 1000° C. of the heat insulation material is 0.20 W/(m·K) or less, 0.15 W/(m·K) or less, 0.13 W/(m·K) or less, 0.10 W/(m·K) or less, or 0.04 W/(m·K) or less. For instance, the thermal conductivity at a temperature of 25° C. of the heat insulation material is 0.045 W/(m·K) or less, or 0.040 W/(m·K) or less.

The coefficient of linear shrinkage by heating of the heat insulation material, when it is heated at a temperature of 1200° C. for 24 hours, is preferably 15% or less. More preferred is 10% or less, 8% or less, 6% or less, or 5% or less. The coefficient of linear shrinkage by heating is calculated using the length (X) of a formed body before heating at a temperature of 1200° C. for 24 hours and the length (Y) of the formed body after the heating from the following expression:

$$\text{Coefficient of linear shrinkage by heating (\%)} = \{(X-Y)/X\} \times 100.$$

The specific surface area of the heat insulation material measured by BET method is 20 m$^2$/g or more, or 30 m$^2$/g or more. The pore volume of the heat insulation material measured by BJH method is 0.3 cm$^3$/g or more, or 0.5 cm$^3$/g or more. The bulk density of the heat insulation material is not particularly limited, but it may be 100 to 800 kg/m$^3$, or 200 to 500 kg/m$^3$, for example.

The heat insulation material of the invention can be used in an environment where heat resistance at a high temperature is required, by utilizing its excellent heat resistance. Namely, the heat insulation material of the invention can be used as a heat insulation material in such an environment where, for example, heat resistance at a temperature of higher than 1100° C. (for example, 1200° C. or higher) is required. the heat insulation material can be used as a heat insulation material that has the highest use temperature of higher than 1100° C. (for example, 1200° C. or higher).

EXAMPLES

Now, explanation will be given to examples of the invention. However, it should be understood that the invention is not limited to the examples.

Example 1

[Production of Heat Insulation Material]

A mixed powder containing alumina particles, a transition suppression material shown in Tables 1 to 4, and S2 fibers (silica-alumina-magnesia fibers, manufactured by AGY) was subjected to molding to prepare a molded body. As the alumina particles, ones were used of which primary particles had an average particle diameter of about 13 nm (fumed alumina particles, manufactured by NIPPON AEROSIL CO., LIMITED.). As to the mixed amount of the components, sum of the amount of the alumina particles and the transition suppression material was 95 weight %, and the amount of S2 fibers was 5 weight %. The amount of the transition suppression material is shown in Tables 1 to 4

Specifically, the alumina particles, the transition suppression material and the fibers were fed to a mixer and mixed through dry processing to prepare a mixed powder.

TABLE 1

| Silica stone | $SiO_2$ | | | | |
|---|---|---|---|---|---|
| wt % | 5.29 | 10.02 | 15.59 | 20.00 | 41.67 |
| Shrinkage (%) | 12.1 | 8.8 | 7.8 | 7.8 | 3.3 |
| Corundum intensity | 4497 | 3838 | 3467 | 2902 | 500 |

TABLE 2

| Talc | $Mg_3Si_4O_{10}(OH)_2$ | | | | |
|---|---|---|---|---|---|
| wt % | 4.85 | 9.22 | 12.65 | 20.00 | 41.67 |
| Shrinkage (%) | 13.7 | 8.2 | 6.7 | 8.3 | 5.8 |
| Corundum intensity | 4462 | 4207 | 3657 | 3152 | 1415 |

TABLE 3

| Mullite | $3Al_2O_3 \cdot 2SiO_2$ | | | | |
|---|---|---|---|---|---|
| wt % | 11.61 | 16.42 | 20.00 | 28.00 | 41.67 |
| Shrinkage (%) | 5.5 | 4.5 | 4.3 | 4.3 | 3.4 |
| Corundum intensity | 3915 | 3670 | 3462 | 2938 | 2313 |

Subsequently, the mixed powder was filled in a mold equipped with a certain deaeration mechanism. Dry press molding was carried out while adjusting press pressure such that a bulk density of the resultant dry press-formed body became to be 270 kg/m³. Then, the dry press-formed body having a plate-like shape was taken out form the mold.

Further, the dry press-formed body was sintered. Namely, the dry press-formed body was heated at 1200° C. for 24 hours.

[Evaluation of Heat Insulation Material]

Based on a change in length of the dry press-formed body between before and after the heating, a coefficient of linear shrinkage by heating at a temperature of 1200° C. for 24 hours was calculated. Namely, a plate-like sample having a size of 100 mm length, 30 mm width and 15 mm thickness was made from each dry press-formed body. Subsequently, the sample was heated in an electric furnace at a temperature of 1200° C. for a certain time. Here, temperature elevation rate up to 1200° C. was 200° C./hour. Again, the length of the sample after heating was measured. Then, the coefficient of linear shrinkage by heating was calculated.

Coefficient of linear shrinkage by heating (%)={($X-Y$)/$X$}×100

(In the expression, X is a length (mm) of a sample before heating, and Y is a length (mm) the sample after heating.)

For the dry press-formed body after heating, XRD measurement was carried out, and the corundum intensity was measured.

The results of measurements are shown in Tables 1 to 4.

Comparative Example 1

A heat insulation material was produced and evaluated in the same manner as in Example 1 except that no transition suppression material was used and a mixed powder of 95 weight % of alumina particles and 5 weight % of fibers were used. The results are shown in Table 5.

TABLE 4

| Fumed silica | $SiO_2$ |
|---|---|
| wt % | 3.0 |
| Shrinkage (%) | 1.8 |

No peak of corundum structure was observed.

TABLE 5

| No suppression material | |
|---|---|
| wt % | 0 |
| Shrinkage (%) | 18.21 |
| Corundum intensity | 5090 |

Example 2

[Production of Heat Insulation Material]

A molded body was prepared in the same manner as in Example 1 by using a mixed powder of alumina particles, silica particles (transition suppression material), zircon (radiation scattering material) and S2 fibers in an amount (weight %) indicated in Table 6. As the silica particles, ones of which primary particles had an average particle diameter of about 12 nm (fumed silica particles, manufactured by TOKUYAMA CORPORATION) were used.

Further, the resultant molded body was heated at a temperature of 1100° C. for 24 hours.

[Evaluation of Heat Insulation Material]

In the same manner as in Example 1, coefficients of linear shrinkage by heating (%) were calculated when the heat insulation material was heated at a temperature of 1200° C. for 48 hours, for 120 hours and for 192 hours, respectively. The results are shown in Table 7.

TABLE 6

|  | Fumed silica 2 wt % | Fumed silica 3 wt % | Fumed silica 4 wt % | Fumed silica 5 wt % | Fumed silica 6 wt % | Fumed silica 7 wt % | Fumed silica 8 wt % | Fumed silica 10 wt % |
|---|---|---|---|---|---|---|---|---|
| Fumed alumina | 73.0 | 72.0 | 71.0 | 70.0 | 69.0 | 68.0 | 67.0 | 65.0 |
| Fumed silica | 2.0 | 3.0 | 4.0 | 5.0 | 6.0 | 7.0 | 8.0 | 10.0 |
| Zircon | 20.0 | 20.0 | 20.0 | 20.0 | 20.0 | 20.0 | 20.0 | 20.0 |
| S2 fibers | 5.0 | 5.0 | 5.0 | 5.0 | 5.0 | 5.0 | 5.0 | 5.0 |
| Total | 100.0 | 100.0 | 100.0 | 100.0 | 100.0 | 100.0 | 100.0 | 100.0 |

TABLE 7

|  | 1200° C.-48 h | 1200° C.-120 h | 1200° C.-192 h |
|---|---|---|---|
| Fumed silica 2% | 5.7 | 12.9 | 13.1 |
| Fumed silica 3% | 4.1 | 10.1 | 10.8 |
| Fumed silica 4% | 2.5 | 6.1 | 6.8 |
| Fumed silica 5% | 1.7 | 3.5 | 3.9 |
| Fumed silica 6% | 1.5 | 2.7 | 2.9 |
| Fumed silica 7% | 1.9 | 2.7 | 2.9 |
| Fumed silica 8% | 2.5 | 3.7 | 4.1 |
| Fumed silica 10% | 3.8 | 5.6 | 6.0 |

Example 3

[Production of Heat Insulation Material]

In the same manner as in Example 2, a mixed powder containing 60 weight % of alumina particles, 5 weight % of silica particles (transition suppression material), 30 weight % of zirconia (radiation scattering material) and 5 weight % of alumina fibers was molded and heated to produce a heat insulation material. Here, in Example 3, the molding was carried out while adjusting press pressure such that the bulk density of the resultant molded body became to be 370 kg/m$^3$.

[Evaluation of Heat Insulation Material]

The coefficient of linear shrinkage by heating (%) when the molded body was heated at a temperature of 1200° C. for 24 hours was calculated in the same manner as in Example 1. As a result, the coefficient of linear shrinkage by heating (%) was 0.1%.

Further, coefficients of linear shrinkage by heating (%) in the cases where the heat insulation material was heated at a temperature of 1200° C. for 48 hours, for 120 hours, for 192 hours and 264 hours, respectively, were calculated. The results are shown in FIG. 1. In the FIGURE, the square points indicate data of the heat insulation material of Example 3.

The thermal conductivity was measured by the below mentioned method. As a result, the thermal conductivity at a temperature of 600° C. was 0.047 W/(m·K), at 800° C. 0.058 W/(m·K), and at 1000° C. 0.071 W/(m·K).

The thermal conductivity was obtained by multiplication of the following three values: coefficient of thermal diffusivity measured by cyclic heat method, specific heat measured by drop calorimeter method, and density of a test sample. Here, the cyclic heat method is a method in which a heat wave (cycle: about 1 hour, amplitude: about 4K) is propagated to a test sample, and coefficient of thermal diffusivity is obtained from a time lag of the heat wave caused within the test sample, i.e. from a time lag of the phase of heat wave. More specifically, when a heat wave is applied to one surface of a rectangular-shaped test sample, the heat wave propagates within the test sample. The coefficient of thermal diffusivity was obtained on the basis of the time lag of the phase of heat wave that is measured at around the center in the thickness direction (in the traveling direction of the heat wave). Further, the drop calorimeter method is a method in which a test sample heated at a high temperature is dropped in a container made of copper (its specific heat is known), and the specific heat of the test sample is obtained from temperature increase of the copper container.

Example 4

[Production of Heat Insulation Material]

A heat insulation material was produced in the same manner as in Example 3 except that S2 fibers were used in place of the alumina fibers.

[Evaluation of Heat Insulation Material]

In the same manner as in Example 1, coefficients of linear shrinkage by heating (%) in the cases where the heat insulation material was heated at a temperature of 1200° C. for 48 hours, for 120 hours, for 192 hours and 264 hours, respectively, were calculated. The results are shown in FIG. 1. In the FIGURE, the diamond points indicate data of the heat insulation material of Example 4.

Experimental Example

A powder material containing 100 weight % of alumina particles without transition suppression material (a powder material consisting of alumina particles) was used. Namely, the powder material was heated for 24 hours at different five temperatures within a temperature range of 800° C. to 1200° C. (800° C., 1000° C., 1100° C., 1150° C. and 1200° C.).

For each of the five powder materials which had been heated at the different temperatures and the unheated powder material, pore volume and specific surface area were measured, and XRD measurement was carried out.

Here, the specific surface area was measured by BET method. The pore volume was measured by BJH method. Namely, a desorption isotherm which indicates a relationship between a relative pressure and an amount of adsorption was obtained by a gas adsorption method that uses a dry press-formed body after heating as a test sample. Pore diameter of the dry press-formed body was obtained from the desorption isotherm, and the pore volume of the dry press-formed body was calculated from the pore diameter.

As a result, the unheated powder material and the powder material heated at a temperature range of 800° C. to 1100° C. had a specific surface area of 100 to 119 (m$^2$/g) and a pore volume of 0.51 to 0.70 (cm$^3$/g), and no corundum peak was detected in the XRD chart.

On the contrary, the powder material heated at a temperature of 1150° C. had a specific surface area of 69 (m$^2$/g) and a pore volume of 0.49 (cm³/g), and the slight corundum peak was detected in the XRD chart.

Further, the powder material heated at a temperature of 1200° C. had a specific surface area of 13 (m²/g) and a pore volume of 0.05 (cm³/g), and only corundum peak was only detected in the XRD chart.

Namely, it was confirmed that powder material composed of alumina particles be impaired in the properties by heating at a temperature of higher than 1100° C. In addition, possibility was indicated that generation of corundum (crystal transition) be affected to such an impairment of the properties.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

All the contents of the literatures described in the specification and the specification of the Japanese application claiming priority under the Paris Convention are incorporated herein by reference in its entirety.

The invention claimed is:

1. A heat insulation material obtained by sintering a raw material comprising:
   67 to 73 weight % of alumina particles having an average particle diameter of 100 nm or smaller,
   2 to 8 weight % of at least one crystal transition suppression material selected from the group consisting of silica particles and silica fume,
   10 to less than 25 weight % of a radiation scattering material of zircon, and
   2 to 9 weight % of one or more fibers selected from the group consisting of silica-alumina-magnesia fibers and alumina fibers;
   wherein an amount of the alumina particles, the crystal transition suppression material, the fibers and the radiation scattering material in the raw material is 95 weight % or more in total, and
   wherein the heat insulation material exhibits a coefficient of linear shrinkage at a heating temperature of 1200° C. for 24 hours that is 5% or less.

2. The heat insulation material according to claim 1, wherein the fibers are silica-alumina-magnesia fibers.

3. The heat insulation material according to claim 1, wherein the raw material comprises:
   5 to 7 weight % of the crystal transition suppression material,
   20 to less than 25 weight % of the radiation scattering material.

4. The heat insulation material according to claim 1, wherein the raw material comprises:
   10 to 20 weight % of the radiation scattering material.

5. The heat insulation material according to claim 2, wherein the raw material comprises:
   20 weight % of the radiation scattering material; and
   5 weight % of the fibers.

6. A method of producing the heat insulation material according to claim 1, which comprises:
   mixing the following components to obtain a mixture:
      the alumina particles having an average particle diameter of 100 nm or smaller,
      the at least one crystal transition suppression material selected from the group consisting of silica particles and silica fume,
      the one or more fibers selected from the group consisting of silica-alumina-magnesia fibers and alumina fibers, and
      the radiation scattering material of zircon;
   subjecting the mixture to press forming to form a press-formed body, and
   sintering the press-formed body.

7. The method of producing a heat insulation material according to claim 6, wherein the sintering is carried out at a temperature of higher than 1000° C.

8. A heat insulation material obtained by sintering a raw material comprising:
   56 to 65 weight % of alumina particles having an average particle diameter of 100 nm or smaller,
   2 to 8 weight % of at least one crystal transition suppression material selected from the group consisting of silica particles and silica fume,
   25 to 35 weight % of a radiation scattering material of zirconia, and
   2 to 9 weight % of alumina fibers;
   wherein an amount of the alumina particles, the crystal transition suppression material, the alumina fibers and the radiation scattering material in the raw material is 95 weight % or more in total.

9. The heat insulation material according to claim 8, wherein the raw material comprises:
   60 weight % of the alumina particles,
   5 weight % of the crystal transition suppression material,
   30 weight % of the radiation scattering material, and
   5 weight % of the fibers.

10. A method of producing the heat insulation material according to claim 8, which comprises:
    mixing the following components to obtain a mixture:
       the alumina particles having an average particle diameter of 100 nm or smaller,
       the at least one crystal transition suppression material selected from the group consisting of silica particles and silica fume,
       the alumina fibers, and
       the radiation scattering material of zirconia;
    subjecting the mixture to press forming to form a press-formed body, and
    sintering the press-formed body.

* * * * *